US005819108A

United States Patent [19]

Hsu et al.

[11] Patent Number: 5,819,108

[45] Date of Patent: Oct. 6, 1998

[54] PROGRAMMING OF SOFTWARE INTO PROGRAMMABLE MEMORY WITHIN A PERIPHERAL DEVICE

[75] Inventors: Hung-Chang Hsu; Chi-Cheng Lin; Meng-Shin Yen, all of Taipei, Taiwan

[73] Assignee: Acer Peripherals, Inc., Taiwan

[21] Appl. No.: 732,949

[22] Filed: Oct. 17, 1996

[51] Int. Cl.[6] ........................ G06F 9/24

[52] U.S. Cl. .................. 395/830; 395/828; 395/835; 395/836; 395/833; 722/2; 722/115; 722/103; 722/497.04

[58] Field of Search .................. 711/2, 115, 103, 711/497.04; 395/833, 830, 835, 836, 828

[56] References Cited

U.S. PATENT DOCUMENTS

| | | | |
|---|---|---|---|
| 5,542,082 | 7/1996 | Solhjell | 711/115 |
| 5,574,932 | 11/1996 | Sato et al. | 395/800.39 |
| 5,581,791 | 12/1996 | Ludwig et al. | 395/860 |
| 5,712,991 | 1/1998 | Wichman et al. | 395/872 |
| 5,713,041 | 1/1998 | Chen et al. | 395/800.42 |

*Primary Examiner*—Tod R. Swann
*Assistant Examiner*—J. Peikari

[57] ABSTRACT

A method for writing software into a programmable memory within a peripheral apparatus initiated by a host computer is provided. The host computer issues a software write command and the peripheral apparatus includes a microcontroller connected to the host computer via an interface. A data line and an address line are provided to connect the microcontroller and the programmable memory. The method comprises the following steps: (1) providing a supervisory program within the programmable memory or the microcontroller, the supervisory program including a software write instruction; (2) the microcontroller executing the software write instruction and down-loading the software from the host computer via the interface; and (3) via the data and address line, performing the write operation of the control software to the programmable memory.

3 Claims, 4 Drawing Sheets

FIG. 4
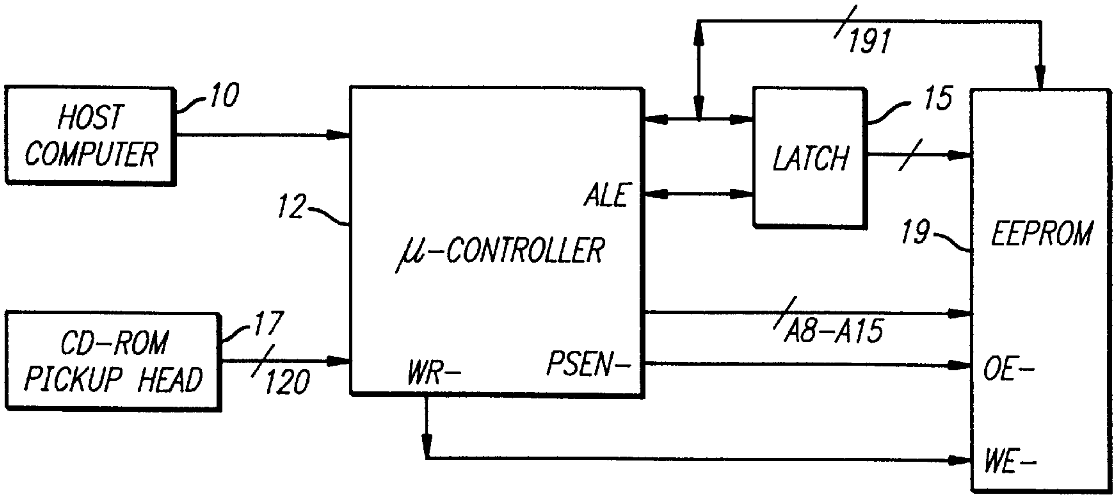
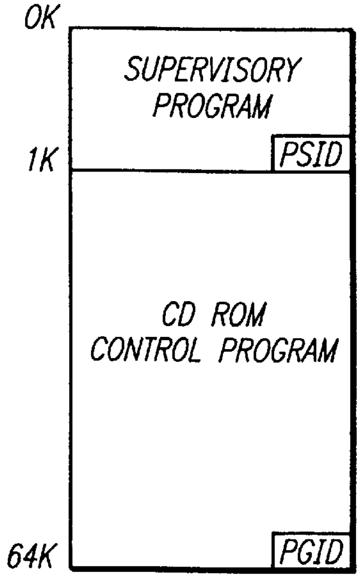
FIG. 5

PROGRAMMING OF SOFTWARE INTO PROGRAMMABLE MEMORY WITHIN A PERIPHERAL DEVICE

BACKGROUND OF INVENTION

The invention relates to a method for writing software are into electric erasable programmable read only memory (EEPROM) or flash memory.

The mask read only memory (Mask ROM) or erasable programmable read only memory (EPROM) has been widely utilized as apparatus for storing software which operates a peripheral device. As shown in FIG. 1, in a conventional approach, the microcontroller 11, e.g. 80C32, executes the instructions of software, inputted via signal lines 131, in EPROM 13, i.e. IC 27512. The signal lines 131 are also inputted to the latch 15. The microcontroller 11, via signal lines 110, connects a CD-ROM pickup head 17. The microcontroller 11 outputs the address latch enable (ALE) signal, address signals (A8–A15), program strobe enable (PSEN) signal to latch 15 and EPROM 13 respectively. The signal lines 131 (AD0–AD7) are multiplexed between address information and data information in a conventional manner. The address latch enable (ALE) signal is used to latch the address information (A0–A7) by the latch 15. In the following, a CD-ROM player is used as an example of the peripheral device.

Under different situations, e.g. within a developing period of a CD-ROM player, the routine within the ROM of the CD-ROM player has to be updated. One of the conventional approaches uses the Mask ROM or EPROM as the software storage device. Conventionally, when update of the routine is required, one has to open the peripheral device and replace the EPROM or Mask ROM with one which has an update version of the software. The following drawbacks are observed with the conventional approaches.

(1) The Mask ROM, which needs a longer lead time when placing an order, is not suitable for peripheral devices of shorter life time.

(2) The programming operation of an EPROM involves a lot of labors.

(3) The Mask ROM or EPROM of the old version is useless and has to be discarded.

(4) When there is a bug within the old version of Mask ROM or EPROM, one has to open the peripheral device, retrieve the old version and insert in the new version of the Mask ROM or EPROM. As a result, the labor cost associated with the replacement of the Mask ROM or EPROM within the peripheral device is high.

Therefore, another conventional approach uses an EEPROM instead of a Mask ROM or EPROM as an alternative storage device for software. However, at the present time, when there is a bug within the old version of the EEPROM, the same replacement procedure as with the Mask ROM or EPROM should be applied and, therefore, the labor cost associated with the replacement of the EEPROM within the peripheral device is still high.

SUMMARY OF INVENTION

To overcome the mentioned drawbacks, this invention provides a method which may program the software into the EEPROM or flash memory via the peripheral's bus interface under control of a host computer.

The method involves a host computer issuing a command, via a standard interface, e.g. Integrated Drive Electronic (IDE), RS 232 or Small Computer System Interface (SCSI), to a CD-ROM player which has a flash memory or EEPROM for storing the control routine.

In the first embodiment, the microcontroller within the CD-ROM player must have a built-in supervisory routine responsible for the programming operation of software into the flash memory or EEPROM.

The supervisory routine includes a "software write" instruction. Afterwards, the microcontroller executes the software write instruction and receives the software from the host computer via the interface. Subsequently, via the microprocessor bus lines, the method performs the programming operation of the control software into the EEPROM or flash memory.

In the second embodiment, there is no need to build any supervisory routine in the microcontroller within the CD-ROM player. Instead, the supervisory routine and the control routine both reside in the EEPROM or flash memory. Other than this, the supervisory program in the second embodiment does the same function as in the first embodiment.

The second embodiment dramatically reduces the cost of hardware implementation, since there is no need to provide a microcontroller of mask ROM type with supervisory software built within the microcontroller.

BRIEF DESCRIPTION OF THE APPENDED DRAWINGS

FIG. 1 discloses the internal functional blocks in a conventional CD-ROM player.

FIG. 2 discloses a circuit of the first embodiment of the invention.

FIG. 3 discloses the flow chart of the first embodiment of invention.

FIG. 4 discloses a circuit of the second embodiment of invention.

FIG. 5 discloses the arrangement of the flash memory 19 in accordance with the second embodiment.

FIG. 6 discloses the flow chart of the second embodiment of invention.

DETAILED DESCRIPTION OF THE PREFERRED EMBODIMENTS

There are several types of software mentioned in this invention:

(a) The "control software" means that software used to control the normal operations of a CD-ROM player, like: read CD-ROM disk, load/unload CD-ROM disk, . . . etc.

(b) The "supervisory software" means the special software proposed in this invention, which is used to perform the programming operations of software into the EEPROM/flash memory.

(c) In this patent specification, the "software" means a program still in the software data form, and the program already programmed into the hardware is named as a "routine".

The First Embodiment

Figure 1:
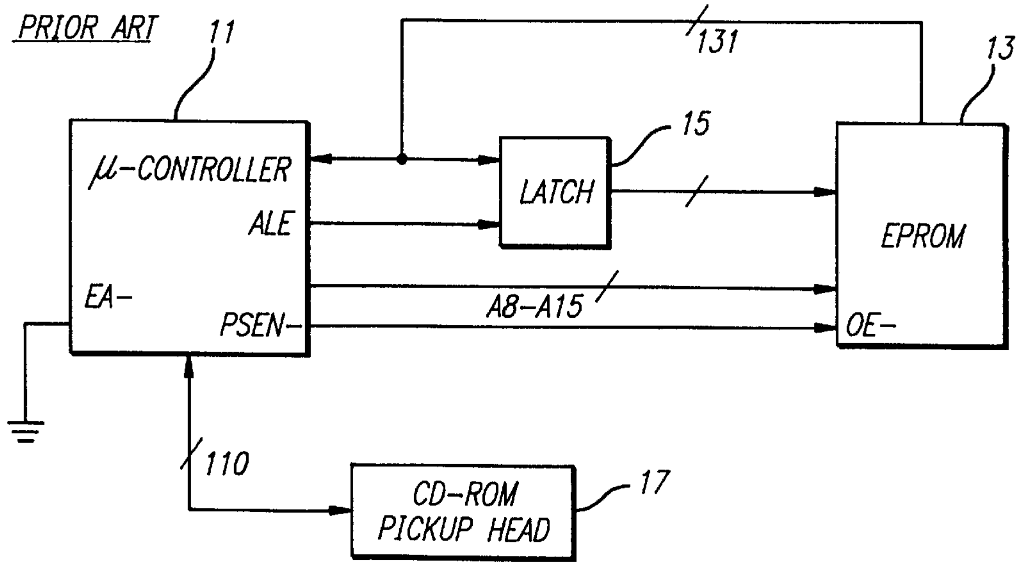
FIG. 1 PRIOR ART
Figure 2:
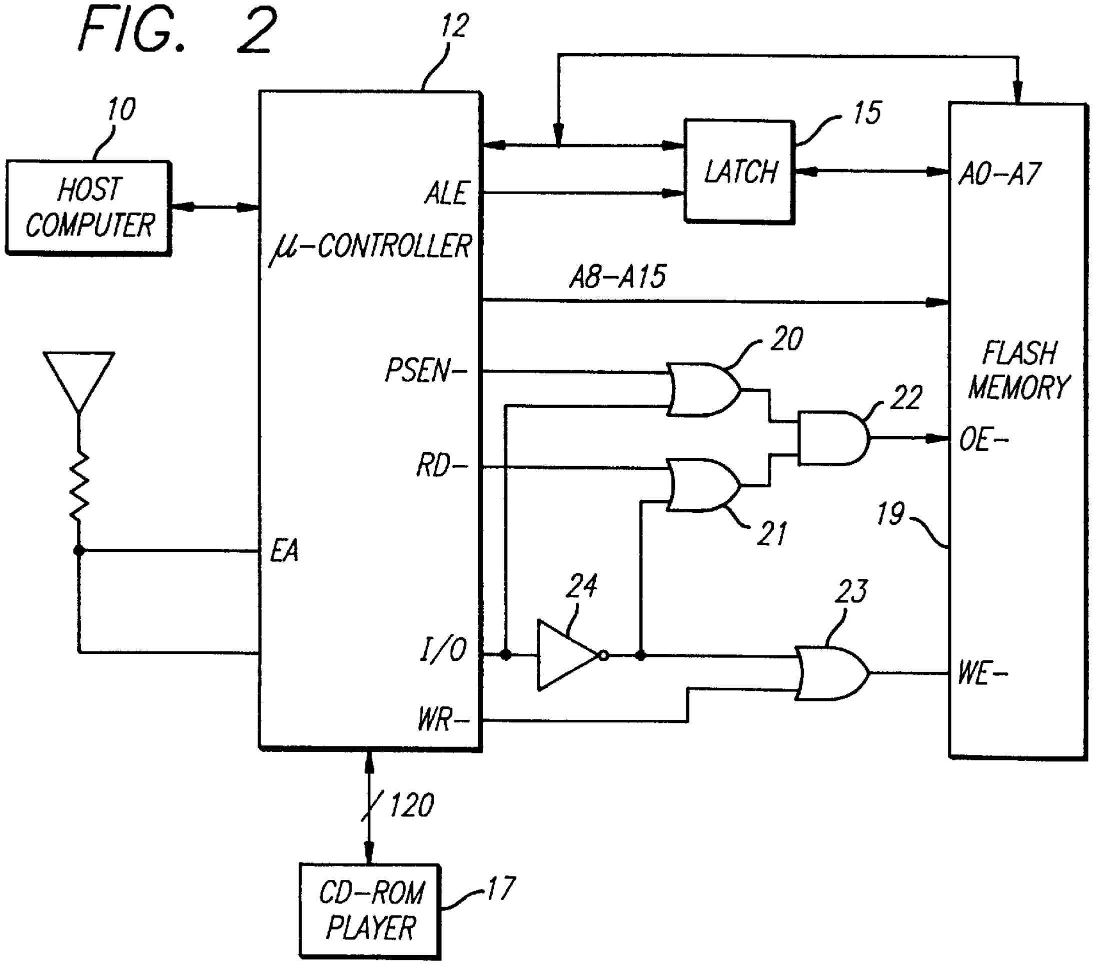

As shown in the circuit of FIG. 2, a supervisory routine is provided within the microcontroller 12 which is responsible for down-loading the control software for the peripheral device, via a standard interface, from the host computer 10 to the flash memory 19 or EEPROM 19. The microcontroller 12 of the peripheral device connects to the memory 19 via signal lines 191 and operates according to the instructions of the control routine already stored within the memory 19. The signal lines 191 (AD0–AD7) are multiplexed between address information and data information in a conventional manner. The signal lines 191 are also inputted to the latch 15. The microcontroller 12 connects to the CD-ROM pickup head 17 via the signal lines 120 and outputs address latch enable (ALE), address signal (A8–A15) and program strobe enable (PSEN) signals to latch 15 and EEPROM 19, via OR gate 20, and AND gate 22 respectively. The control signal WR from the microcontroller 12 is inputted to the WE pin of the memory via OR gate 23 to perform the write operation. The gates 21, 23 are also OR gates. The microcontroller 12 asserts a RD signal to read data from the memory 19, and asserts Program Strobe Enable signal to strobe the memory 19 outputting the routine therein.

Figure 3:
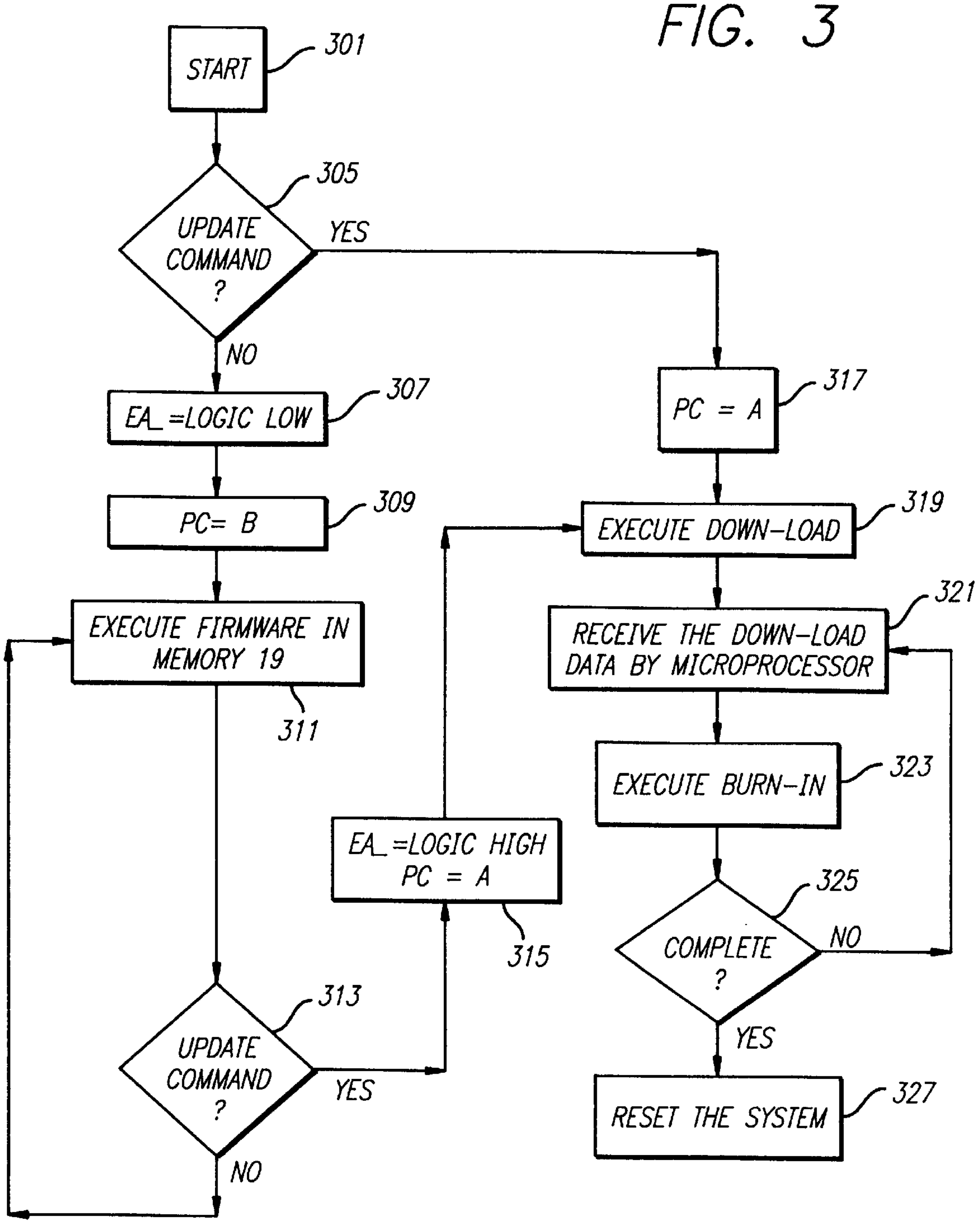

As shown in FIG. 3, the operation of the first embodiment of the present invention starts at block 301. After the power-on period of the system at block 301, in which the EA line in FIG. 2 is logic high, the microcontroller 12 executes the instructions therein starting at address value 0, i.e. program counter equal to 0, which detects an update command from host computer 10. If the microcontroller 12 does not receive the update command from host computer 10 at block 305, the microcontroller 12 pulls the EA line to logic low, via the I/O pin connected also to the EA line in FIG. 2, at block 307. Thereafter, the microcontroller 12 sets program counter to value B at block 309. Starting from address value B, a plurality of Non Operation Codes (NOP) are provided and executed to smooth the program switching recited hereinafter. As switching from the supervisory routine in the microcontroller 12 to the control routine in the memory 19 is completed, the operation of peripheral device follows the instructions of the control routine in the memory 19 at block 311. During predetermined operation of the control routine in memory 19, if the microcontroller 12 receives the update command from host computer 10 at block 313, execution path goes to block 315 in which the EA line is raised to logic high, via I/O pin, and the program counter is set to value A which is the starting address of the software write instruction within the microcontroller 12. In block 319, downloadinig of the new version of the control software is performed.

When requiring down-loading or update of the control program of the peripheral device, the host computer 10, via the standard interface, gives associated commands to the microcontroller 12. As the microcontroller 12 receives the update command at block 305 after power-on of block 301, the microcontroller 12 then sets the program counter to value A at block 317 which is the starting point of the update routine within the microcontroller 12. Thereafter, downloading operation within the update routine by the microcontroller 12 is performed at block 319. At block 321, the host computer 10 sends the new version of the software to the microcontroller 12 via the interface. At block 323, via signal lines 191 and address lines (A8–A15), programming operation of memory 19 is performed. At block 325, it is decided whether the programming operation is completed. If not, go to block 321 to continue operation. If complete, at block 327, reset the system, and the peripheral device thereafter operates in accordance with the new version software just programmed into the memory 19.

The I/O pin of microcontroller 12 is also used to control the operation of memory 19. As I/O line is logic low during the time microcontroller 12 executes the routine within the memory 19, the PSEN signal is outputted to the OE pin of the memory 19 by microcontroller 12 strobing the output of the codes from the memory 19. As EA is logic high during the time microcontroller 12 executes the resident routine within the microcontroller 12 to perform the programming operation, OE and I/O pins are logic high prohibiting the output of the codes from the memory 19. During this period, the programming control signal WR from the microcontroller 12 is inputted to the WE pin of the memory via OR gate 23 enabling programming of software codes.

The Second Embodiment

As shown in FIG. 4, the microcontroller 12 connects to the memory 19 via signal lines 191 and operates according to the instructions already programmed within the memory 19. The signal lines 191 (AD0–AD7) are multiplexed between address information and data information in a conventional manner. The signal lines 191 are also inputted to the latch 15. The microcontroller 12 connects to the CD-ROM pickup head 17 via the signal lines 120 and outputs address latch enable (ALE), address (A8–A15), program strobe enable (PSEN) and WR signals to latch 15 and EEPROM 19 respectively. The microcontroller 12 asserts the Program Strobe Enable signal to strobe the memory 19 outputting the routine therein. Different from the first embodiment, a supervisory routine is programmed within the flash memory or EEPROM 19 which functions to detect any software update command from the host computer 10.

As shown in FIG. 5, assume the pre-program supervisory routine has a size of 1K bytes which is loaded and located at the lowest 1K bytes address of memory 19. The locations higher than those of the supervisory routine are used as the main memory space, e.g. 63K, for storing the peripheral device's control routine which is to be programmed. When pre-programming the supervisory routine, one predetermined location, e.g. the last addressable location within the 1K byte space is programmed with a preset identification code (PSID), e.g. a value of 00 (Hex). This identification code may, alternatively, also include information regarding the version number, e.g. V. 2.0. In the main memory space storing the peripheral device's control software there is also reserved a corresponding location for storing a program identification code (PGID) embedded within the downloaded control software. During the download operation of the control software, this PGID value is written into this PGID location. If the PSID code includes information regarding the software version number, the PGID information should also have the corresponding information.

Figure 6:
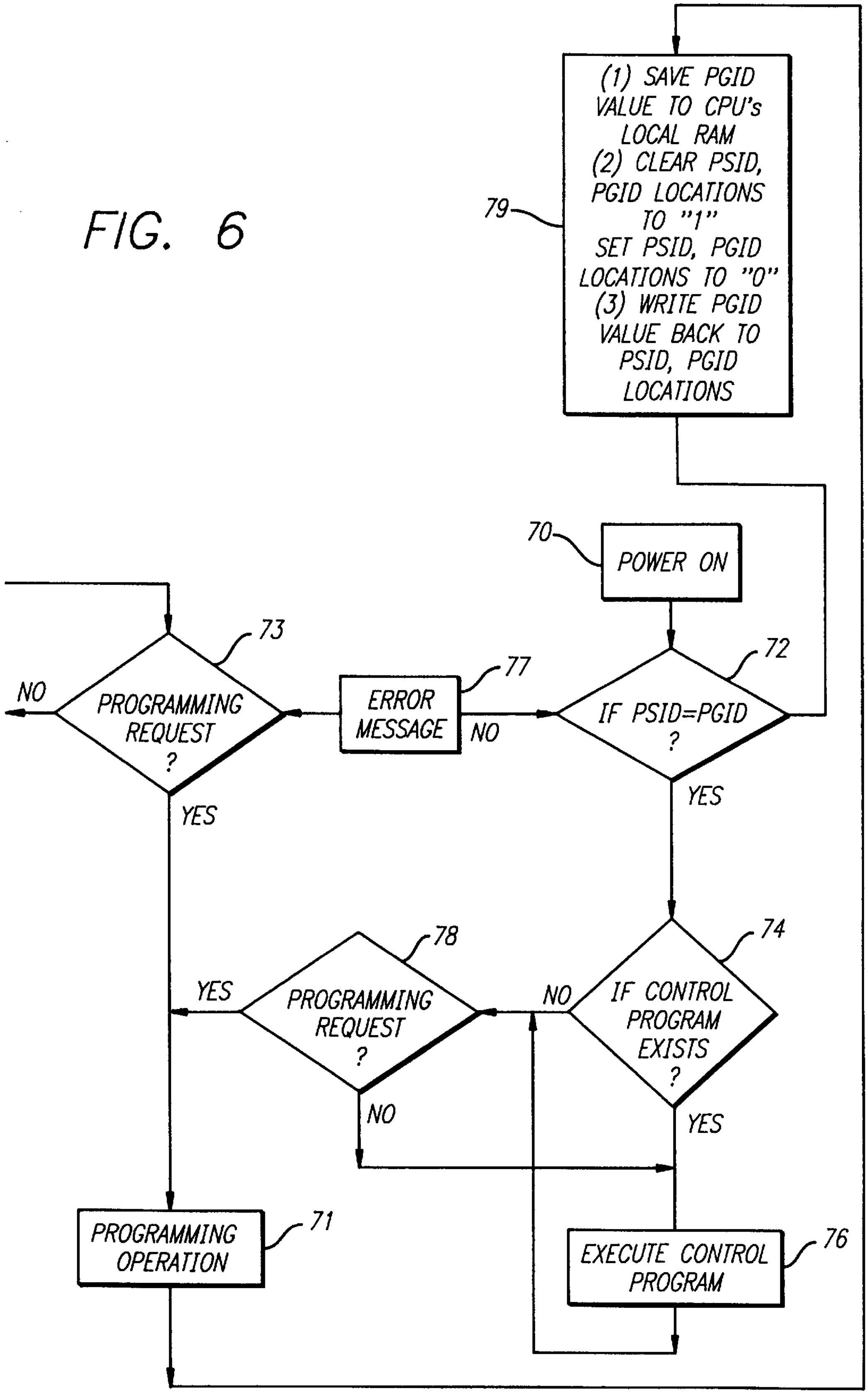

Referring to FIG. 6, the second embodiment starts at block 70. At block 72, PSID is compared to PGID to decide their identity. If they are the same, at block 74, test if the control routine exists in the main memory space mentioned regarding FIG. 5. If it exists, at block 76, the control routine is executed to operate the peripheral device. During the execution of the control routine, detection of the programming command from the host computer 10 is performed at block 78, by either a conventional polling scheme or interrupt scheme. If the programming command is detected, at block 71, perform the programming, e.g. writing of the update version of the software. Also, the new PGID value is programmed into the PGID location in block 71. After the programming operation, at block 79, (1) PGID the value is stored in the local RAM (not shown) of the microcontroller 12, (2) locations corresponding to PSID, and PGID are cleared to value "1" first and afterwards set to value "0", and (3) the value within the local RAM is written back into the locations storing PSID and PGID respectively. It is well known flash memory or EEPROM has limited times of programming operation. The main purpose of operations at block 79 is to program these two locations more frequently than other memory cells. As a result, these two locations will extinguish earlier than other locations. In addition, when PSID is not equal to PGID at block 72, this indicates the flash memory or EEPROM 19 might have already been not usable due to its limited times of programming operation. The error message is outputted at block 77 and then there is checking whether the programming command is requested in block 73.

What is claimed is:

1. A method for writing update software into a programmable memory within a peripheral apparatus, the programmable memory being partitioned into a first part for storing a supervisory program and a second part for storing a peripheral control program, a predetermined preset location within the first part for storing a predetermined identification code, a predetermined program location within the second part for storing the predetermined identification code, a host computer initiating a software write procedure by issuing a write command, the peripheral apparatus including a microcontroller connected to the host computer via an interface, with a data line and an address line for connecting the microcontroller and the programmable memory, comprising:

(1) storing the predetermined identification code at the preset location and storing the supervisory program within the first part of the programmable memory, the supervisory program including a software write instruction;

(2) checking under control of the microcontroller whether codes at the program and preset locations are identical;

(3) if codes at the program and preset locations are identical in step (2), programming under control of the microcontroller an update peripheral control program into the second part of the programmable memory, and an update identification code at least twice into each of the preset and program locations;

(4) if codes at the program and preset locations are not identical in the step (2), generating under control of the microcontroller an error message.

2. The method recited in claim 1, wherein the programmable memory is an EEPROM.

3. The method recited in claim 1, wherein the programmable memory is a flash memory.

* * * * *